United States Patent
Baria et al.

[11] Patent Number: 5,301,169
[45] Date of Patent: Apr. 5, 1994

[54] SEISMIC SOURCE

[75] Inventors: Roy Baria; Michael Manning, both of Truro; Michael Allcock, St. Ives, all of United Kingdom

[73] Assignee: Secretary of State for Trade and Industry in Her Britannic Majesty's Government of the United Kingdom of Great Britain and Northern Ireland, London, United Kingdom

[21] Appl. No.: 779,002
[22] PCT Filed: May 4, 1990
[86] PCT No.: PCT/GB90/00703
  § 371 Date: Nov. 15, 1991
  § 102(e) Date: Nov. 15, 1991
[87] PCT Pub. No.: WO90/13830
  PCT Pub. Date: Nov. 15, 1990

[30] Foreign Application Priority Data

May 8, 1989 [GB] United Kingdom ............... 8910574

[51] Int. Cl.⁵ .................................................. G01V 1/40
[52] U.S. Cl. ............................ 367/147; 181/106; 181/110
[58] Field of Search ............... 367/147; 181/106, 110

[56] References Cited

U.S. PATENT DOCUMENTS

| | | |
|---|---|---|
| 3,286,226 | 11/1966 | Kearsley et al. ............ 367/147 |
| 3,700,169 | 10/1972 | Naydan ............................ 239/4 |
| 4,039,042 | 8/1977 | Edwards et al. ............... 181/106 |
| 4,076,980 | 2/1978 | Arnold et al. ................... 250/270 |
| 4,651,311 | 3/1987 | Owen et al. .................... 367/147 |
| 4,715,376 | 12/1987 | Nowacki et al. .............. 128/24 A |

FOREIGN PATENT DOCUMENTS 1479795 7/1977 United Kingdom .

OTHER PUBLICATIONS

"Electrohydraulics," *Science Journal*, Mar., 1968, pp. 61–66.

Primary Examiner—J. Woodrow Eldred
Attorney, Agent, or Firm—William R. Hinds

[57] ABSTRACT

A source of seismic waves operable within a borehole filled with liquid comprises a module supported by a cable. The module includes means to generate a high voltage and to charge a bank of capacitors, and means to connect the capacitors across a pair of electrodes forming a spark gap. The electrodes are immersed in liquid at the same pressure as the borehole liquid and acoustically continuous with it, and are separated by a gap of width between 0.5 and 20 mm. If the gap is greater than about 5 mm, both the electrodes should be covered with insulation except at the positions where the spark is to be formed. The module can operate automatically at considerable depths and at high pressures.

8 Claims, 3 Drawing Sheets

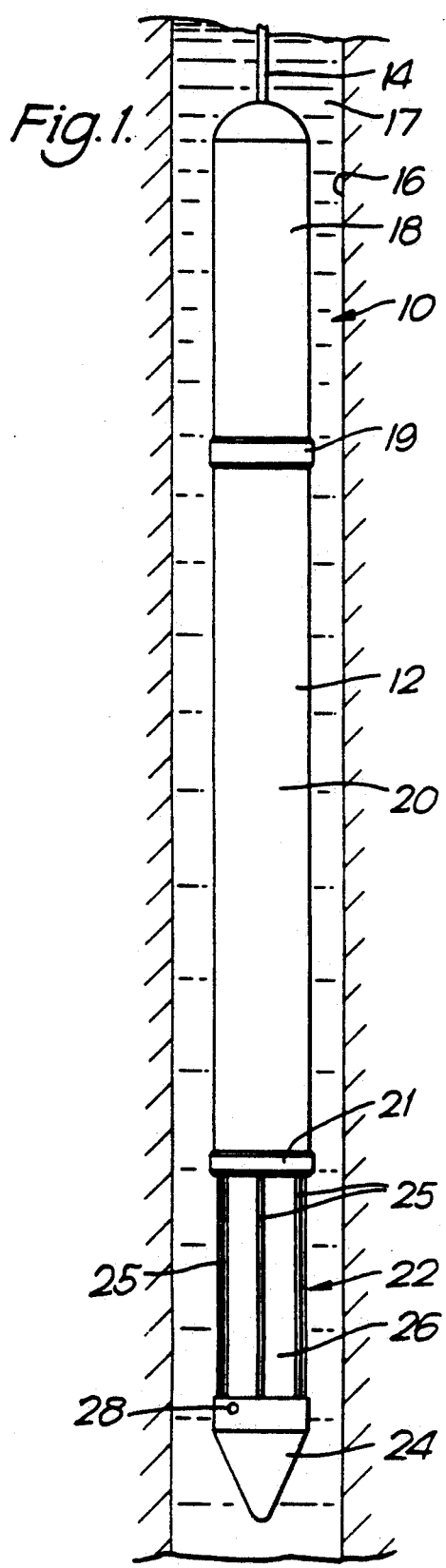
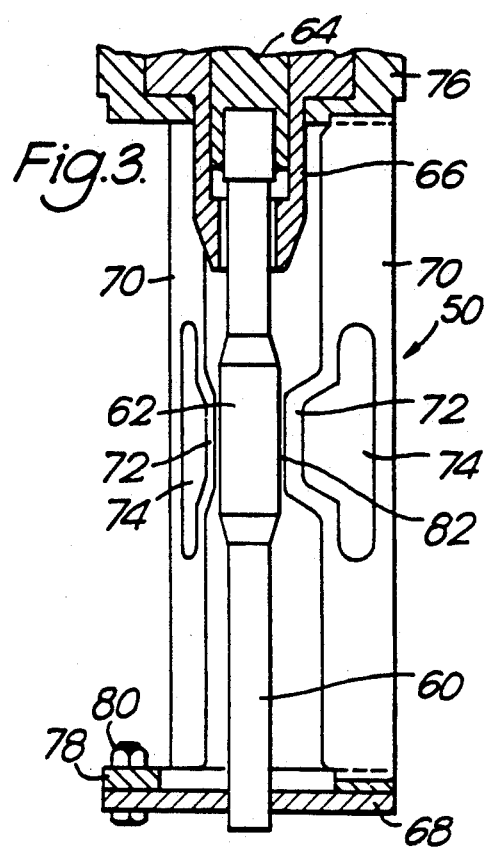
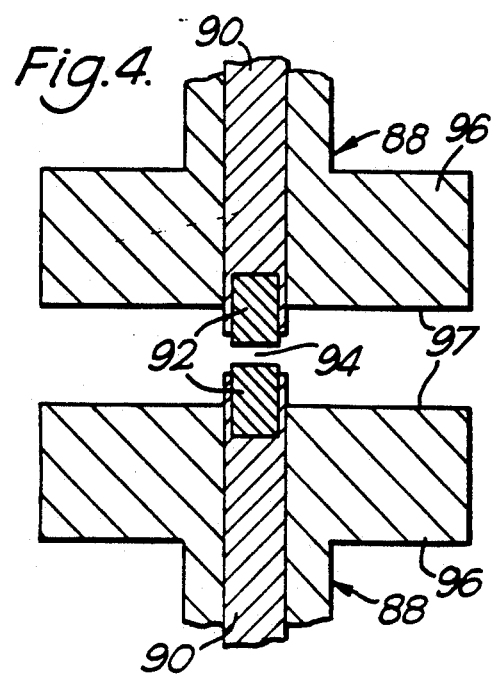

SEISMIC SOURCE

This invention relates to an apparatus for generating seismic waves, operable within a borehole.

Information about geological strata and structures can be obtained by causing seismic waves to propagate through the region of interest and sensing the times of arrival of those waves at different locations. Such a procedure enables the position and shape of seismic reflectors, which often are boundaries between different rocks, to be discovered. The amplitudes of the received waves can also provide information on the degree of attenuation caused by the rocks, which is dependent on the type of rock, and on the frequency of the seismic waves.

According to the present invention there is provided an apparatus for generating seismic waves operable in a borehole, the apparatus comprising a module and a cable to support the module within the borehole, the cable incorporating a conductor to provide electric current to the module, the module incorporating capacitor means, means for charging the capacitor means to a high voltage, a spark gap, and means for connecting the spark gap to the capacitor means, the spark gap comprising two electrodes separated by a gap, which gap in use is occupied by liquid acoustically coupled to the wall of the borehole, such that during operation sparks are created which extend from one electrode to the other, and pressure waves are thereby generated, characterized in that the capacitance and the voltage are such that the stored electrical energy is more than 1 kJ, the connecting means comprises a triggered arc gap, and the electrodes of the spark gap are of such a shape that the gap across which the sparks are to be created is of substantially uniform width, the width having a value between 5 and 20 mm, and such that the spark-creating current is concentrated in said gap, and the surfaces of both the electrodes are covered by an insulating layer except at those positions where the sparks are to be created.

Preferably the spark gap is enclosed by a rubber sleeve, the sleeve being filled with clean saline water, there being a pressure equalising duct connecting the water within the sleeve to the liquid in the borehole; the rubber sleeve is substantially transparent to the acoustic waves so that the saline water within the sleeve and the liquid in the borehole are acoustically continuous. The preferred arc gap is a tritium-filled triggered arc gap; when a 20 kV trigger pulse is provided to the arc gap an avalanche is initiated so the arc gap conducts electricity. This may be triggered whenever the capacitor means are almost fully charged.

The apparatus can operate at considerable depth in a borehole, for example at hydrostatic pressure up to 30 MPa and at a temperature up to 125° C. (if the borehole is filled with pure water this is equivalent to a depth of up to 3 km). When the charged capacitor means is electrically connected to the spark gap, a spark is created in the gap which heats the liquid in the gap to form a vapour bubble; this occurs rapidly, creating a pressure wavefront which propagates through the liquid around the spark gap and the borehole liquid to the borehole wall. There seismic waves are generated in the surrounding rock. The seismic waves have a wide frequency range between about 200 Hz and 10 kHz; the predominant frequencies may be between about 5 and 6 kHz, or between 1 and 3 kHz, or between 200 Hz and 1.8 kHz, depending on the design of the spark gap.

One factor affecting the frequency range is the width of the gap between the two electrodes, the frequencies being lower for a larger gap. The electrode insulation lowers the capacitance of the electrodes, so lowering the frequency range, and also prevents the occurrence of multiple current paths which could suppress sparking altogether.

In one embodiment the spark gap is a cage structure comprising a central rod electrode and three inter-connected side electrodes extending parallel to the rod electrode and equally spaced around it, each side electrode being shaped so that over a portion of its length it is separated from the rod electrode by a gap of the desired width. The said portion is desirably between 10 and 30 mm long, preferably about 20 mm long. It will be appreciated that during the spark discharge the electrodes experience substantial forces, so they must be rigid, and be held at the desired separation rigidly.

In another embodiment the spark gap comprises two rod electrodes aligned with each other, with a gap of the desired width between their ends. To minimise spark erosion of the rod ends, the end portions may be of a refractory conducting material such as tungsten. To ensure lower frequencies of seismic waves each rod may be surrounded by an insulating member so that the spark-generated vapour bubble and associated pressure wavefront is constrained in its expansion by opposed faces of these insulating members.

The invention will now be further described, by way of example only, and with reference to the accompanying drawings in which:

FIG. 1 shows a seismic source in a borehole;

FIG. 3 shows a sectional view to a larger scale of the spark electrodes of the source of FIG. 1;

FIG. 4 shows a sectional view of alternative spark electrodes to those shown in FIG. 3.

Figure 2:
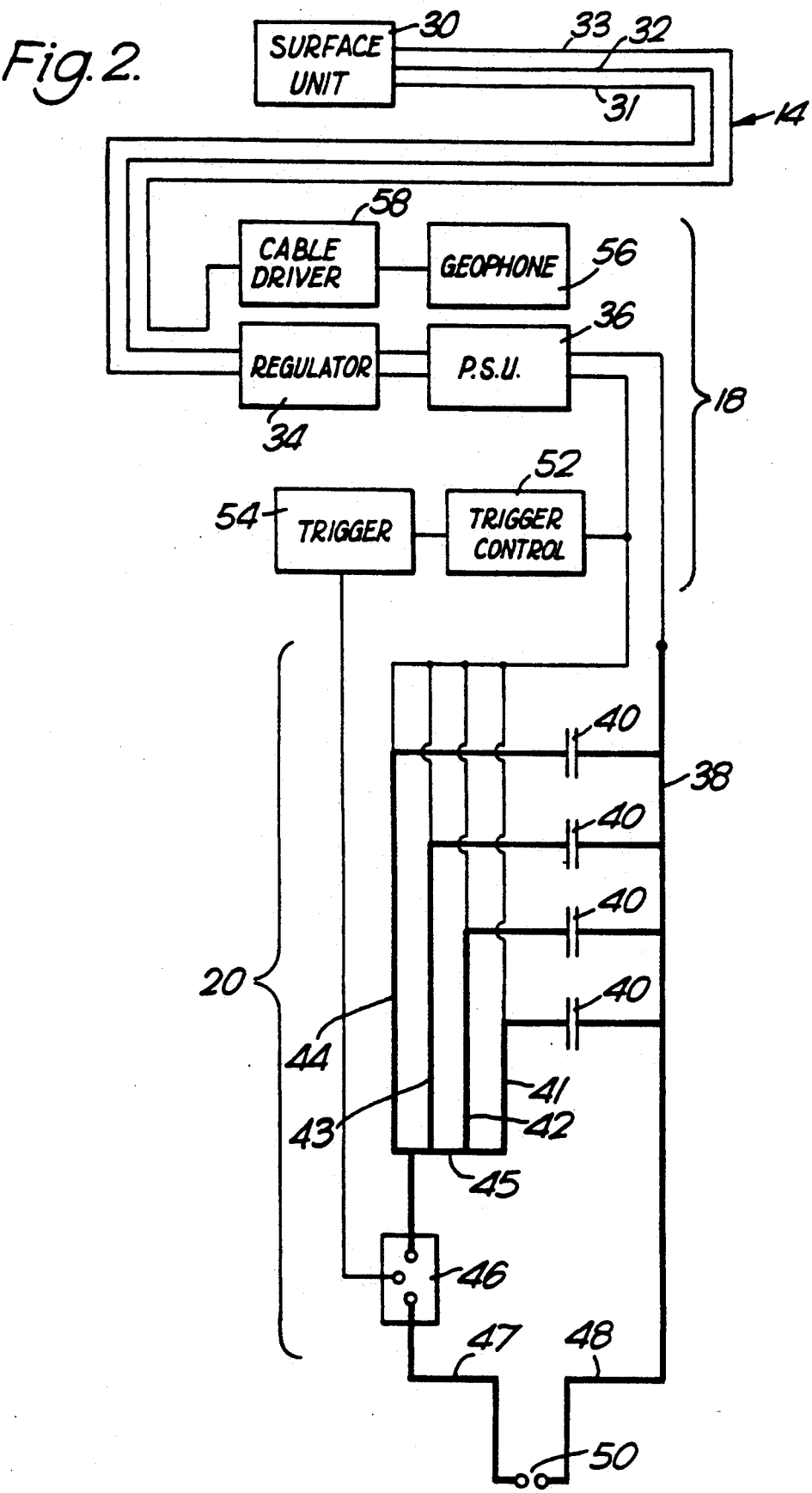
FIG. 2 shows a block diagram of the electrical circuitry of the source of FIG. 1.

Referring to FIG. 1 a seismic source 10 comprises a generally cylindrical sparker module 12 of length 3.7 m and of diameter 0.14 m which can be suspended by a wireline cable 14 within a borehole 16. The borehole 16 is filled with fluid 17 which is typically water, and so the module 12 is exposed to a hydrostatic pressure increasing with depth, and which is for example 30 MPa at a depth of 3 km. The module 12 consists of an upper tubular portion 18 containing electronics, a central tubular portion 20 containing an array of capacitors, and a lower portion 22, fixed to each other by threaded collars 19 and 21. The lower portion 22 consists of the collar 21 and a conical nose 24 connected by four rods 25 (only three are shown) spaced equally apart around the circumference; within the cage formed by these rods 25 is a neoprene rubber sleeve 26 fixed at one end to the collar 21 and at its other end to the nose 24 which encloses a saline water-filled volume containing spark electrodes (described later). A bleed screw 28 ensures pressure equilibrium between the inside and the outside of the sleeve 26 while restricting water flow in or out of the sleeve 26.

Referring now to FIG. 2 there is shown in diagrammatic form the electronic circuitry of the seismic source 10. The cable 14, which may be as much as six kilometers long, connects the module 12 electrically to a surface unit 30, and includes wires 31, 32 for carrying power to the module 12 and at least one signal-carrying wire 33. The surface unit 30 provides a potential difference of 150 V between the power wires 31, 32, and receives signals via the wire 33 indicating the instant at which a seismic wave is generated.

Within the module 12 the power wires 31, 32 are connected to a voltage regulator 34 which produces a steady 100 V output. This is supplied to a power supply unit 36 which generates 20 V dc outputs (not shown) for operating the electronics, and a 4 kV dc high voltage output with an internal resistance of about 400 kilohms. The zero volts terminal of the high voltage output is connected to an aluminium beam 38 which extends the length of the central portion 20. Four 35 microfarad capacitors 40 are arranged in a line within the central portion 20, and one terminal of each is connected to the beam 38. The 4 kV terminal of the high voltage output from the unit 36 is connected by respective wires to the other terminals of the four capacitors 40, the latter terminals being connected to four high current copper busbars 41, 42, 43, 44 which extend to near the lower end of the central portion 20 where they all join to a common copper bracket 45. The bracket 45 is connected to one terminal of a low-pressure, tritium-filled triggered arc gap 46. Busbars 47 and 48 extend from the opposite terminal of the arc gap 46 and from the lower end of the beam 38, respectively, to the spark electrodes 50 (described later) in the lower portion 22 of the module 10. Also connected to the 4 kV terminal of the high voltage output from the unit 36 is a trigger control unit 52 connected to a trigger unit 54; the unit 54 is connected to the trigger terminal of the arc gap 46 by a wire extending the length of the central portion 20.

The upper portion 18 of the module 12 also includes a geophone 56, signals from which are transmitted via a cable driver unit 58 to the signal wire 33, and so to the surface unit 30.

In operation of the source 10 the power supply unit 36 gradually charges the capacitors 40 up to 4 kV, the charging current being approximately constant at about 10 mA, and the time taken for the whole charging process being about 70 seconds. The increasing potential difference across the capacitors 40 is monitored by the trigger control unit 52, and when the rate of increase drops to below a preset threshold, indicating that the capacitors 40 are almost fully charged, the trigger unit 54 is activated. This starts a timer circuit, and after ten seconds the trigger unit 54 sends a 20 kV pulse to the trigger terminal of the arc gap 46. This initiates a discharge in the low-pressure tritium, so the busbar 47 is electrically connected to the bracket 45. The capacitors 40 consequently discharge across the spark electrodes 50, creating an arc or spark within the saline water inside the rubber sleeve 26 and extending from one electrode 50 to the other. (The discharge current tends to be oscillatory, and the characteristics of the discharge can be changed by changing the inductance of the discharge circuit, for example by forming part of the busbar 47 into a ten-turn coil (not shown) of inductance about 2.3 microhenries. Such a coil has been found to extend the life of the capacitors 40.) The temperature rise and consequent increase in volume due to the spark results in the formation of a gas bubble and a pressure front. This pressure wave is transmitted through the saline water inside the sleeve 26, through the sleeve 26 (which has approximately the same acoustic impedence as water), through the borehole liquid 17 and so into the surrounding rock. The peak pressure due to the wavefront is about 1 atmosphere at a distance of 1 meter from the spark. The pressure wave is also sensed by the geophone 56 which sends a signal to the surface unit 30 indicating the instant at which the spark occurred. Once the capacitors 40 are discharged the discharge through the arc gap 46 ceases and so the capacitors 40 are again charged up by the power supply unit 36, and the above process is repeated.

Referring now to FIG. 3 the spark electrode assembly 50 comprises a central brass rod electrode 60 of diameter 10 mm but with a middle part 62 of length 34 mm and of diameter 14 mm. At one end the electrode 60 is soldered to a copper terminal 64 which is connected to the busbar 47 (see FIG. 2), this end being surrounded by an insulating tube 66 of poly-ether-ether-ketone (PEEK) and at the other end the electrode 60 locates in a central hole in a nylon disc 68. Surrounding the rod electrode 60 like a cage are three identical brass side electrodes 70 (only two are shown), equally spaced. Each electrode 70 is a generally rectangular brass strip 3 mm thick, 16 mm wide and 150 mm long, with a wider middle part 72 with inclined edges, the widest part being 25 mm wide and 22 mm long. There is an aperture 74 defined in this middle portion 72 and the adjacent parts of the electrode 70, the aperture 74 coming to 4 mm of the edges of the electrode 70. At one end the electrodes 70 are soldered into slots in an outer brass tube 76 which is connected to the busbar 48 (see FIG. 2), and at the other end they are soldered into slots in a brass ring 78 fixed to the nylon disc 68 by nuts and bolts 80 (only one is shown). The arrangement is such that there are gaps 82 of width 1 mm between the middle part 62 of the electrode 60 and the middle parts 72 of the electrodes 70.

In operation the assembly 50 is immersed in saline water within the rubber sleeve 26 and is exposed to a large hydrostatic pressure. When the capacitors 40 are discharged as described above a spark is created at the narrowest point between the electrodes 60 and 70, that is along the three gaps 82 each of length 22 mm and of width 1 mm. The pressure wave expands radially outwards, the apertures 74 minimizing the shadowing effect of the outer electrodes 70. For efficient generation of a pressure wave the spark current must be large, and so the spark must be of low resistance and so too must the rest of the discharge circuit (i.e. beam 38, busbars 41, 42, 43, 44, bracket 45, arc 46 and busbars 47 and 48). Plasma resistance increases with pressure, so for operation at high pressure the spark gap 82 must be narrow; the gap must not be too small, as for efficient energy conversion the resistance of the spark plasma in the gap 82 must be considerably greater than the resistance in the rest of the discharge circuit. The seismic waves produced have a wide frequency range, between about 300 Hz and 10 kHz; with the gaps 82 being of width 1 mm the waves are principally between 5 and 6 kHz. If the gaps 82 are arranged to be wider, the waves are of lower frequency. In a modification (not shown) the gaps 82 are 10 mm wide, the rod electrode 60 is covered by an insulating layer except for the middle part 62, and the side electrodes 70 are covered similarly except for the flat faces of the middle parts 72 closest to the rod electrode 60.

Referring now to FIG. 4 there is shown an alternative design of spark electrodes to that of FIG. 3. In this case there are two aligned electrodes 88, each comprising a brass rod 90 of diameter 12 mm, with a tungsten tip 92 of diameter 10 mm brazed into a recess in the end.

There is a gap 94 of width 1.5 mm between the opposed tungsten tips 92. The rods 90 are connected electrically to the two busbars 47 and 48 of FIG. 2. Each rod 90 is a tight fit in a nylon tube element 96 which has a flat face 97 of diameter 70 mm set back about 6 mm from the end of the electrode 88. When the electrodes 88 are energised as described earlier, there is a spark discharge across the gap 94. The expanding gas bubble and the associated pressure wave expand but with a cylindrical rather than spherical shape, approximately, because of the constraint imposed on the bubble by the opposed flat faces 97. In this case the seismic waves produced are principally of frequency between 1 and 3 kHz.

Figure 5:
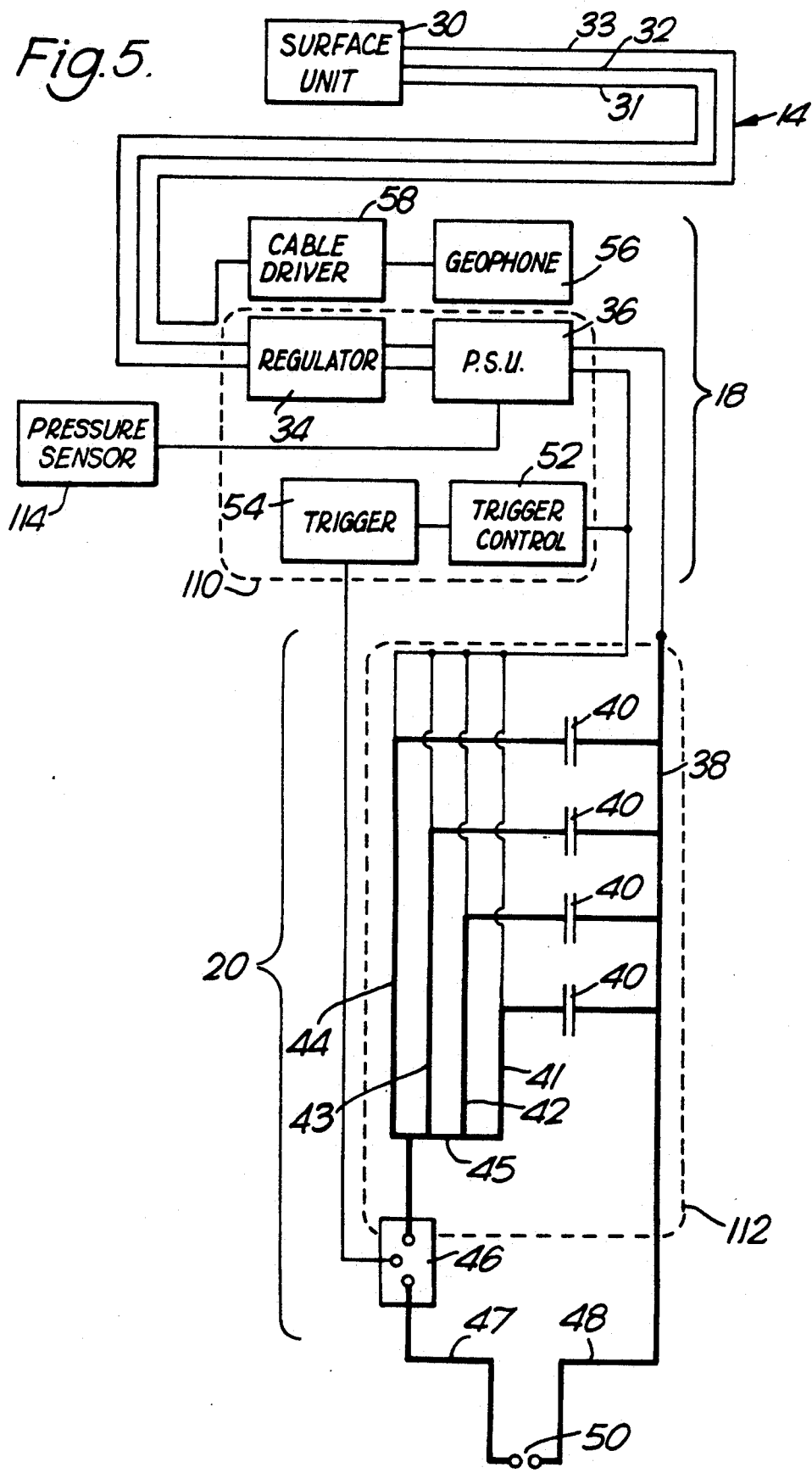
FIG. 5 shows modifications to the diagram of FIG. 2.

In another design (not shown) the spark gap is defined between two aligned electrodes 88 as shown in FIG. 4, but differing in that the gap between the tungsten tips 92 is 10 mm, and in that each brass rod 90 is covered by a close-fitting polytetrafluoroethylene (ptfe) sleeve so that only the tips 92 are exposed to the saline water. In operation the ptfe sleeves ensure that the electric current flows only between the two tips 92 so that sparks are generated effectively. In this case the seismic waves are of frequency between 200 Hz and 1.8 kHz, with a peak intensity at about 1.1 kHz.

Where the module 12 is to be lowered to such a depth that the ambient temperature to which it is exposed is greater than about 70° C. it is desirable to protect the electronics from such high temperatures. As shown in FIG. 5 the regulator 34, the power supply unit 36, the trigger control 52 and the trigger 54 are installed inside a first stainless steel vacuum flask 110 (shown diagrammatically by a broken line) and the capacitors 40 and the arc gap 46 installed inside a second stainless steel vacuum flask 112 (shown diagrammatically by a broken line). The first vacuum flask 110 may be closed by conventional means, while the arc gap 46 may advantageously be used as the closure for the second flask 112, as indicated diagrammatically in FIG. 5. Each flask preferably contains a heat sink consisting of a piece of an alloy which melts at about 70° C., along with a liquid such as a fluorinated hydrocarbon (e.g. fluorinert) which is a good dielectric and which acts as a good heat transfer medium.

In the electronic circuitry of the seismic source 10, the power supply unit 36 was described as providing a 4 kV dc high voltage output. In a modification to the source 10, shown in FIG. 5, means 114 are provided to sense the hydrostatic pressure to which the source 10 is exposed, and the output high voltage is adjusted in accordance with the pressure, so as to ensure effective pressure-wave generation in spite of changes in the spark gap resistance due to changes in hydrostatic pressure.

We claim:

1. An apparatus for generating seismic waves operable in a borehole, the apparatus comprising a module and a cable to support the module within the borehole, the cable incorporating a conductor to provide electric current to the module, the module incorporating capacitor means, means for charging the capacitor means to a high voltage, a spark gap, and means for connecting the spark gap to the capacitor means, the spark gap comprising two electrodes separated by a gap, which gap in use is occupied by liquid acoustically coupled to the wall of the borehole, such that during operation sparks are created which extend from one electrode to the other, and pressure waves are thereby generated, characterized in that the capacitance and the voltage are such that the stored electrical energy is more than 1 kJ, the connecting means comprises a triggered arc gap, and the electrodes of the spark gap are of such a shape that the gap across which the sparks are to be created is of substantially uniform width, the width having a value between 5 and 20 mm, and such that the spark-creating current is concentrated in said gap, and the surfaces of both the electrodes are covered by an insulating layer except at those positions where the sparks are to be created.

2. An apparatus as claimed in claim 1 wherein the spark gap is enclosed by a rubber sleeve, and means are provided to ensure the pressures inside and outside the sleeve are equal.

3. An apparatus as claimed in claim 1 wherein the spark gap comprises a central electrode and a plurality of interconnected cage electrodes around it.

4. An apparatus as claimed in claim 1 wherein the spark gap comprises two electrodes aligned end to end with a gap between the opposed ends.

5. An apparatus as claimed in claim 4 also comprising means to constrain the expansion of any bubble generated in the spark gap, such that the bubble expands cylindrically.

6. An apparatus for generating seismic waves operable in a borehole, the apparatus comprising a module and a cable to support the module within the borehole, the cable incorporating a conductor to provide electric current to the module, the module incorporating capacitor means, means for charging the capacitor means to a high voltage, a spark gap, and means for connecting the spark gap to the capacitor means, the spark gap comprising two electrodes separated by a gap, which gap in use is occupied by liquid acoustically coupled to the wall of the borehole, such that during operation sparks are created which extend from one electrode to the other, and pressure waves are thereby generated, characterized in that the capacitance and the voltage are such that the stored electrical energy is more than 1 kJ, the connecting means comprises a triggered arc gap, and the electrodes of the spark gap are of such a shape that the gap across which the sparks are to be created is of substantially uniform width, the width having a value between 5 and 20 mm, and such that the spark-creating current is concentrated in said gap, and the surfaces of both the electrodes are covered by an insulating layer except at those positions where the sparks are to be created, wherein the module incorporates at least one vacuum flask enclosing electronic components, and the triggered arc gap acts as a closure means for the vacuum flask.

7. An apparatus for generating seismic waves operable in a borehole, the apparatus comprising a module and a cable to support the module within the borehole, the cable incorporating a conductor to provide electric current to the module, the module incorporating capacitor means, means for charging the capacitor means to a high voltage, a spark gap, and means for connecting the spark gap to the capacitor means, the spark gap comprising two electrodes separated by a gap, which gap in use is occupied by liquid acoustically coupled to the wall of the borehole, such that during operation sparks are created which extend from one electrode to the other, and pressure waves are thereby generated, characterized in that the capacitance and the voltage are such that the stored electrical energy is more than 1 kJ, the connecting means comprises a triggered arc gap, and the electrodes of the spark gap are of such a shape that the gap across which the sparks are to be created is of substantially uniform width, the width having a value between 5 and 20 mm, and such that the spark-creating current is concentrated in said gap, and the surfaces of both the electrodes are covered by an insulating layer except at those positions where the sparks are to be created, wherein the module also incorporates means to sense the hydrostatic pressure to which the module is exposed, and means to adjust the voltage to which the capacitors are charged in accordance with the sensed pressure.

8. An apparatus as claimed in claim 1 wherein the connecting means also incorporates a coil to provide localized inductance.

* * * * *